(12) United States Patent
Hidaka

(10) Patent No.: US 7,319,528 B2
(45) Date of Patent: Jan. 15, 2008

(54) SURFACE TEXTURE MEASURING INSTRUMENT

(75) Inventor: Kazuhiko Hidaka, Veenendaal (NL)

(73) Assignee: Mitutoyo Corporation, Kawasaki-shi (JP)

( * ) Notice: Subject to any disclaimer, the term of this patent is extended or adjusted under 35 U.S.C. 154(b) by 21 days.

(21) Appl. No.: 11/263,742

(22) Filed: Nov. 1, 2005

(65) Prior Publication Data
US 2006/0109480 A1    May 25, 2006

(30) Foreign Application Priority Data
Nov. 2, 2004    (JP)    ............... 2004-319388

(51) Int. Cl.
*G02B 7/04* (2006.01)
*H01J 3/14* (2006.01)

(52) U.S. Cl. .................. 356/600; 356/496; 356/511; 356/514; 356/489; 356/501; 250/234; 250/306; 250/376; 250/201.3

(58) Field of Classification Search ................ 356/600, 356/511, 495, 489, 496, 501, 514, 73
See application file for complete search history.

(56) References Cited

U.S. PATENT DOCUMENTS

| | | | |
|---|---|---|---|
| 4,538,911 A * | 9/1985 | Heynacher et al. | 356/501 |
| 5,623,338 A * | 4/1997 | Wickramasinghe et al. | 356/501 |
| 5,677,525 A * | 10/1997 | Volcker et al. | 250/201.3 |
| 5,789,734 A * | 8/1998 | Torigoe et al. | 250/201.2 |
| 5,894,122 A | 4/1999 | Tomita | |
| 6,154,326 A * | 11/2000 | Ueyanagi et al. | 359/819 |
| 6,229,609 B1 * | 5/2001 | Muramatsu et al. | 356/601 |
| 6,344,656 B1 * | 2/2002 | Hopkins et al. | 250/559.22 |
| 2003/0062463 A1 * | 4/2003 | Narita et al. | 250/201.3 |
| 2003/0147083 A1 * | 8/2003 | Hill | 356/491 |
| 2003/0160967 A1 * | 8/2003 | Houston et al. | 356/501 |

FOREIGN PATENT DOCUMENTS

| | | |
|---|---|---|
| EP | 1055901 | 11/2000 |
| JP | 11-44693 | 2/1999 |
| WO | 02/10828 | 2/2002 |

OTHER PUBLICATIONS

Vaez-Iravani M et al: "Polarization, Interference Contrast, and Photoluminescence Imaging in Near Field Optical Microscopy", Materials Research Society Symposium Proceedings, Materials Research Society, Pittsburgh, PA, US,, vol. 332, Nov. 29, 1993, pp. 437-447.

* cited by examiner

*Primary Examiner*—Gregory J. Toatley, Jr.
*Assistant Examiner*—Rebecca C. Slomski
(74) *Attorney, Agent, or Firm*—Rankin, Hill, Porter & Clark LLP

(57) ABSTRACT

A surface texture measuring instrument provided with a near-field measuring unit (30) including a near-field probe (33) that forms a near-field light at a tip end thereof when a laser beam is irradiated, a laser source (35) that generates the laser beam to be irradiated on the near-field probe (33), a detection element (38) that detects scattering effect of the near-field light generated when the near-field probe (33) is moved close to a workpiece (1), and an actuator (32) that displaces the near-field probe (33) and the workpiece (1) in a direction moving close to/away from each other, includes: a laser length-measuring unit (20) that measures a relative distance between a reference position and the workpiece (1) in the vicinity of the tip end of the near-field probe (33) or a relative distance between the reference position and the near-field probe (33).

6 Claims, 3 Drawing Sheets

SURFACE TEXTURE MEASURING INSTRUMENT

BACKGROUND OF THE INVENTION

1. Field of the Invention

The present invention relates generally to surface texture measuring instruments, and more particularly to surface texture measuring instruments for measuring surface texture of a workpiece utilizing evanescent light (near-field light).

2. Description of Related Art

An optical microscope has been known as an example of a surface texture measuring instruments for measuring surface texture of a workpiece utilizing evanescent light (near-field light), which is disclosed in Document 1 (JP-A-9-243649).

The optical microscope includes an optical waveguide probe having, at a tip end thereof, an extremely small opening with the diameter smaller than the wavelength of the light, an evanescent light generator that generates evanescent light on a surface of a sample, and an evanescent light detector that condenses and detects scattered light of the evanescent light, which is scattered at the tip end of the optical waveguide probe when the optical waveguide probe is moved close to the vicinity of the surface of the sample.

When the optical waveguide probe is moved close to the vicinity of the surface of the sample, the evanescent light generated on the surface of the sample is scattered at the tip end of the optical waveguide probe, and the scattered light is detected by the evanescent light detector. While scanning the sample with the probe along the surface of the sample, if a distance between the sample and the probe is controlled to keep the intensity of the scattered light constant, i.e., if the probe is vertically moved against the sample, the tip end of the probe can hold a fixed distance from the surface of the sample, thereby obtaining the surface texture of the sample by detecting a vertically moving amount of the prove.

Heretofore, in the optical microscope utilizing the near-field light, in order to obtain distance information, it is necessary to obtain in advance a relationship between a distance from the probe at the tip end of the detector to a workpiece (sample) and detection information, more particularly, the intensity of the scattered light of the evanescent light, which is variable according to the distance. However, the above-described relationship is strongly material-dependent regarding the workpiece. Owing to this, it is extremely difficult to obtain the relationship in advance in view of the material-dependency.

To overcome such difficulty, it is conceivable to constantly perform calibration with another measuring instrument such as a laser interferometer.

However, since mechanical and optical elements of the measuring instrument must be disposed in positions different from the position of the near-field scanning optical microscope, there are generated uncertainty of calibration in terms of time and space. Especially, the uncertainty in terms of space may be a serious bottleneck for the near-field scanning optical microscope that performs nanometer-length measurement on the workpiece.

In other words, the bottleneck is the difference in measurement properties between the length measurement position of the measuring instrument and the length measurement position of the near-field scanning optical microscope. Or, if the measuring instrument is moved to the length measurement position of the near-field scanning optical microscope in order to solve this bottleneck, the movement axis generated in the movement will cause further uncertainty, thus resulting in submicrometer-level uncertainty.

SUMMARY OF THE INVENTION

An object of the present invention is to provide a surface texture measuring instrument that can perform high-accuracy calibration.

A surface texture measuring instrument according to an aspect of the invention provided with a near-field measuring unit including a near-field probe that forms a near-field light at a tip end thereof when a laser beam is irradiated, a laser source that generates the laser beam to be irradiated on the near-field probe, a detection element that detects scattering effect of the near-field light generated when the near-field probe is moved close to a workpiece, and an actuator that displaces the near-field probe and the workpiece in a direction moving close to/away from each other, includes: a laser length-measuring unit that measures a relative distance between a reference position and the workpiece in the vicinity of the tip end of the near-field probe or a relative distance between the reference position and the near-field probe.

According to the above aspect of the present invention, the workpiece and the near-field probe are relatively moved so that the measurement portion of the workpiece confronts the near-field probe. In this state, the measurement is performed with the laser length-measuring unit and the near-field measuring unit.

First, in the measurement with the laser measuring unit, utilizing the laser beam, for instance, the relative distance between the reference position and the workpiece in the vicinity of the tip end of the near-field probe is measured. Or, the relative distance between the reference position and the near-field probe is measured.

In the measurement with the near-field measuring unit, when the laser beam is irradiated on the near-field probe, near-field light is formed at the tip end of the near-field probe. In this state, the actuator is driven, and for instance, when the near-field probe is moved close to the workpiece, so that the near-field light formed at the tip end of the near-field probe is scattered by the workpiece, and the detection element detects the scattered light. The actuator is driven until the output from the detection element becomes the preset constant value. Namely, the near-field probe is displaced toward the workpiece so that the relative distance between the near-field probe and the workpiece becomes constant.

According to the respective positions where the relative positions of the near-field probe of the near-field measuring unit and the workpiece are changed, the measurement is performed with the laser length-measuring unit and the near-field measuring unit, and then the driving amount of the actuator of the near-field measuring unit is calibrated based on the relative distance between the reference position and the workpiece in the vicinity of the tip end of the near-field probe, or the relative distance between the reference position and the near-field probe respectively obtained by the laser length-measuring unit. Consequently, since the driving amount of the actuator is calibrated based on the reference distance between the reference position and the workpiece or the near-field probe respectively obtained by the length measurement with the laser length-measuring unit, high-accurate calibration can be performed.

Incidentally, the measurement with the near-field measuring unit and the laser length-measuring unit may be performed at the same time, or in different timings. In other words, with the use of the near-field measuring unit and the laser length-measuring unit, the substantially same position of the workpiece is measured at the same time, or at different timings, so that the driving amount of the actuator of the near-field measuring unit is calibrated based on the distance information obtained by the measurement with the laser length-measuring unit, thereby eliminating negative effect due to the material-dependency of the workpiece and providing high-accurate calibration.

Herein, the near-field probe may employ any structure as long as the near-field light can be formed at the tip end. For example, an extra small opening may be formed in the tip end, so that the light leaked from the opening forms the near-field light region, or cantilever probe may be employed, so that the light irradiated on the tip end thereof forms the near-field light region at the tip end thereof.

Preferably, in the above-described surface texture measuring instrument, the laser length-measuring unit may be a laser length-measuring interferometer that splits the laser beam into two beams, one of which is irradiated on the workpiece in the vicinity of the tip end of the near-field probe and the other one of which is irradiated on a reference face as the reference position, to measure a relative distance between the reference position and a laser irradiated portion of the workpiece based on interference light caused by reflected light from the workpiece and reflected light from the reference position.

With this configuration, using the laser length-measuring interferometer, the relative distance information of the reference position with the laser irradiated portion of the workpiece or with the near-field probe can be measured highly accurately.

Preferably, in the above-described surface texture measuring instrument, the laser source may generate the laser beam with wavelength $\lambda 1$, the laser length-measuring unit may utilize the laser beam with wavelength $\lambda 2$ which is smaller than the wavelength $\lambda 1$, and the near-field probe may have an opening through which the laser beams from the laser source and the laser length-measuring unit are input, the opening being larger than wavelength $\lambda 2$ and smaller than wavelength $\lambda 1$ in diameter.

With this configuration, the laser beam from the laser source cannot pass through the opening of the near-field probe, and therefore the laser beam forms the near-field light in the vicinity of the opening. On the other hand, since the laser beam from the laser length-measuring unit is irradiated on the workpiece through the opening of the near-field probe, the laser length-measuring unit can measure the relative distance between the reference position and the laser irradiated portion of the workpiece. In other words, the laser length-measuring unit measures the workpiece right below the tip end of the near-field probe, thus performing high-accurate calibration. Additionally, since the laser length-measuring unit measures the length of the laser beam via the opening, noise caused by diffused reflection from a portion other than the laser irradiated portion can be eliminated.

Preferably, the above-described surface texture measuring instrument may further include: a relative movement unit that moves the workpiece such that the near-field probe is relatively moved along the surface of the workpiece; and a drive controller that drives the actuator such that an output from the detection element becomes constant.

With this configuration, after the above-stated calibration is performed, when the measurement is performed by relatively moving the near-field probe along the surface of the workpiece with the near-field probe moved close to the workpiece and by driving the actuator so that the output from the detection element of the near-field measuring unit becomes constant, the surface texture of the workpiece can highly accurately be measured two-dimensionally or three-dimensionally.

Preferably, the above-described surface texture measuring instrument may further include: a calibration unit that refers to relative distance information measured by the laser length-measuring unit and converts a driving amount of the actuator of the near-field measuring unit into distance information.

With this configuration, there is provided the calibration unit that refers to the relative distance measured with the laser length-measuring unit, i.e., the relative distance between the reference position and the laser irradiated portion of the workpiece or the near-field probe, and converts the driving amount of the actuator of the near-field measuring unit into the distance information, thereby automatically performing the calibration of the near-field measuring unit.

Preferably, in the above-described surface texture measuring instrument, an optical axis of the laser beam of the near-field measuring unit irradiated toward the near-field probe may be coaxially arranged relative to an optical axis of the laser beam of the laser length-measuring unit.

With this configuration, since the optical axis of the laser beam of the near-field measuring unit irradiated toward the near-field probe is coaxially arranged relative to the optical axis of the laser beam of the laser length-measuring unit, the instrument becomes compact.

Preferably, in the above-described surface texture measuring instrument, the near-field probe may include a first supporting body, a second supporting body coupled to the first supporting body, a piezoelectric element disposed between the first and second supporting bodies, and a balancer disposed on a surface of the second supporting body opposite to the piezoelectric element. The first supporting body may include a first supporter having an inner space, and a probe head supported at the center of the inner space of the first supporter via a plurality of beams respectively extending from equiangular arrangement positions of the first supporter toward the center and having an opening for forming the near-field light. The second supporting body may include a second supporter coupled to the first supporter and having an inner space, and a ring-like holder supported at the center of the inner space of the second supporter via a plurality of beams respectively extending from equiangular arrangement positions of the second supporter toward the center. The piezoelectric element may be disposed between the probe head of the first supporting body and the holder of the second supporting body and may be formed cylindrical centering on an axis penetrating through the center of the first and second supporting bodies so as to vibrate in the axial direction. And, the balancer may be cylindrical and coaxially disposed relative to the axis of the piezoelectric element, mass of the balancer being equal to that of the probe head.

With this configuration, when the piezoelectric element is vibrated, the near-field probe is vibrated in the axial direction. Herein, the vibration in the axial direction of the near-field probe preferably has an arbitrary frequency lower than the natural frequency fc. Then, since the output signal with the same period as the vibration period of the near-field probe is output, the output signal is demodulated by a Band-Pass Filter (BPF) or a Peak Hold (PH), and the feedback is provided to the actuator so that the demodulated signal becomes constant, thereby restraining disturbance vibration.

And, since the probe head is supported at the center of the inner space of the first and second supporters via the each three beams respectively extending from the equiangular arrangement positions of the first and second supporters of the first and second supporting bodies toward the center, remarkably high frequency can be excited as compared to the ordinary cantilever probe. Generally, when the position of the probe etc. is controlled in accordance with the feedback fed by a sensor, if the control is based on the frequency higher than the natural frequency fc, the probe will be oscillated. This is because the phase is rapidly lagged due to the resonance frequency of the sensor as in physical background. Since the present invention has the above-described configuration, the natural frequency fc can be heightened, thereby realizing of heightening vibration as well as speeding up of the measurement.

Since the near-field probe has longitudinal vibration, the near-field probe will not affect on the optical property as compared to having of flexural vibration, thus providing high accurate measurement. And, as shown in FIG. 3, the vibration mode is vertically symmetrical with the center being the node of vibration, so that the vibration can be restrained by the supporting bodies to function as a so-called dynamic vibration absorber.

DETAILED DESCRIPTION OF PREFERRED EMBODIMENT(S)

Embodiments of the present invention will be described below with reference to attached drawings.

First Embodiment

Figure 1:
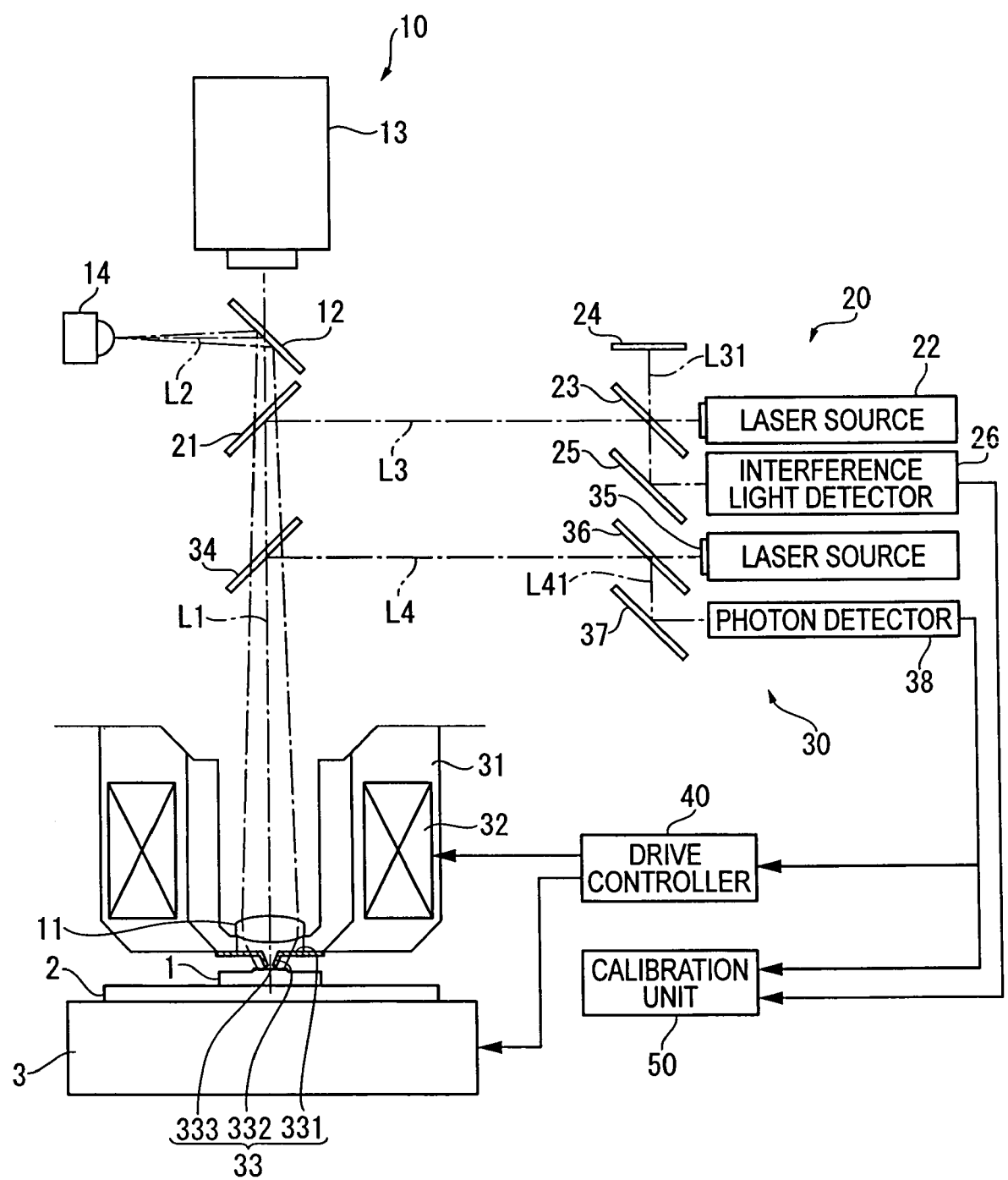
FIG. 1 is an illustration showing an optical microscope according to a first embodiment of the present invention.

FIG. 1 shows an optical microscope of a first embodiment. The optical microscope includes a table 2 on which a workpiece 1 is mounted, a relative movement unit 3 that moves the table 2 three-dimensionally (in horizontal, longitudinal, and vertical directions), an optical observation unit 10 that images and observes the workpiece 1 with a camera etc., a laser length-measuring unit 20, a near-field measuring unit 30, a drive controller 40, and a calibration unit 50.

The optical observation unit 10 includes an objective lens 11, a half-mirror 12 arranged on an optical path L1 of the objective lens 11, a CCD camera 13 (image pickup unit) arranged on the optical path L1 of the objective lens 11 to image a light transmitted through the half-mirror 12 (a reflected light from the workpiece 1), and a light source 14 arranged on an optical axis L2 orthogonal to the optical axis L1 of the objective lens 11 to irradiate light toward the half-mirror 12.

The laser length-measuring unit 20 utilizes a laser beam with wavelength $\lambda 2$, and is formed by a laser length-measuring interferometer by which the laser beam is split into two beams, one of the beams is irradiated on the workpiece 1 while the other one of beams is irradiated on a reference face, and distance information of a portion of the workpiece with the laser beam irradiated based on interference light of reflected light from the workpiece 1 with reflected light from the reference face.

The laser length-measuring interferometer includes a half-mirror 21 arranged on the optical axis L1 of the objective lens 11, a laser source 22 arranged on an optical axis L3 orthogonal to the optical axis L1 of the objective lens 11, a half mirror 23 arranged on the optical axis L3 to split the laser beam from the laser source 22 into the two beams of transmitted light and the reflected light, the reference face 24 (reference position) arranged on an optical axis L31 orthogonal to the optical axis L3 to reflect the reflected light (second laser light) from the half-mirror 23 back to the half-mirror 23, a mirror 25 arranged on the optical axis L31, and an interference light detector 26 that receives the interference light of the reflected light reflected by the mirror 25 as well as the workpiece 1 with the reflected light from the reference face 24.

The near-field measuring unit 30 includes an actuator 32 that displaces a holder 31 holding the objective lens 11 along the optical axis L1, a near-field probe 33 arranged integrally with the holder 31 and fixed near the objective lens 11, a half-mirror 34 arranged on the optical axis L1 of the objective lens 11, a laser source 35 arranged on an optical axis L4 orthogonal to the optical axis L1 of the objective lens 11, a half-mirror 36 arranged on the optical axis L4, a mirror 37 arranged on an optical axis L41 orthogonal to the optical axis L4 to reflect the reflected light from the half-mirror 36, and a photon detector 38 (detection element) that receives the reflected light from the mirror 37.

The near-field probe 33 has a fixing section 331 fixed at a lower end of the holder 31, and a tapered cylindrical probe head 332 provided at the center of the fixing section 331 with an opening 333 at a tip end thereof, the probe head 332 gradually narrowing downward in diameter. The fixing section 331 can transmit the light from the light source 14. For instance, a plurality of beams are arranged from the lower end of the holder 31 toward the center with the probe head 332 held at the center. The diameter of the opening 333 is larger than the wavelength $\lambda 2$ of the laser beam from the laser source 22 but smaller than wavelength $\lambda 1$ of the laser beam from the laser source 35. Herein, since the wavelength $\lambda 2$ of the laser beam from the laser source 22 is set to 442 nm (blue laser) and the wavelength $\lambda 1$ of the laser beam from the laser source 35 is set to 633 nm (helium-neon laser), the diameter of the opening 333 is formed to be 500 nm.

Accordingly, the laser beam from the laser source 22 is irradiated on the workpiece 1 after passing through the opening 333 of the near-field probe 33, so that the laser length-measuring unit 20 can measure the change in difference between the optical path to the workpiece 1 and that to the reference face 24. When the position of the reference face 24 is fixed, the change of the workpiece 1 along the optical axis (distance information) can be measured.

On the other hand, the laser beam from the laser source 35 cannot pass through the opening 333 of the near-field probe 33, and forms near-field light at the vicinity of the opening 333. The near-field light provides significant effect within a sphere having the diameter about the diameter of the opening.

The drive controller 40 controls the operation of the relative movement unit 3 to move the workpiece 1 such that the near-field probe 33 of the near-field measuring unit 30 is relatively moved along the surface of the workpiece 1, and also drive the actuator 32 such that the output of the photon detector 38 of the near-field measuring unit 30 becomes constant. Namely, the actuator 32 is driven such that the distance from the near-field probe 33 to the workpiece 1 becomes constant.

The calibration unit 50 refers to the relative distance between the reference face 24 and the laser irradiated portion of the workpiece respectively measured by the laser length-measuring unit 20, and then calibrates the driving amount of the actuator 32 of the near-field measuring unit 30. In other words, with the use of the near-field measuring unit 30 and the laser length-measuring unit 20, the same position of the workpiece 1 is measured at the same time, or at different timings, so that the driving amount of the actuator 32 of the near-field measuring unit 30 is calibrated based on the relative distance measured by the laser length-measuring unit 20.

Next, an example of measurement procedure will be described.

First, a part of the workpiece 1 to be measured is found with the optical observation unit 10, and then the table 2 on which the workpiece 1 is mounted is moved by the relative movement unit 3 so that the part to be measured is located right below the objective lens 11. In this state, while the laser length-measuring unit 20 measures the relative distance with the workpiece, the actuator 32 is driven so that the output from the photon detector of the near-field measuring unit 30 becomes constant.

In the length measurement with the laser length-measuring unit 20, the laser beam from the laser source 22 is split into two beams. One of the laser beams reaches the near-field probe 33 through the half-mirrors 23, 21, 34 and objective lens 11, and then irradiates the workpiece 1, whereas the other one of the laser beams irradiates the reference face 24. The reflected light from the workpiece 1 is input to the half-mirrors 34, 21 and then half-mirror 23, interferes with the reflected light from the reference face 24, and is detected by the interference light detector 26 via the mirror 25. Namely, the change in difference between the optical path to the workpiece 1 and that to the reference face 24 is detected.

In the length measurement with the near-field measuring unit 30, when the laser beam from the laser source 35 (the laser beam with the wavelength λ1) passes through the half-mirrors 36, 34 and is input to the near-field probe 33, the light beam forms the near-field light at the opening 333 in the tip end of the near-field probe 33. Since the near-field probe 33 is moved close to the surface of the workpiece 1 by driving of the actuator 32, the near-field light formed at the tip end of the near-field probe 33 is scattered by the workpiece 1. Then, the near-field light becomes diffused light, and is detected by the photon detector 38 after passing through the objective lens 11, half-mirrors 34, 36 and being reflected by the mirror 37. That is, the scattered light of the near-field light is detected by the photon detector 38. The actuator 32 is driven until the output from the photon detector 38 becomes the preset constant value. Incidentally, in order to reduce reflection noise, a pin hole may be inserted at any location on the optical path between the laser source 35 and the objective lens 11.

According to the above-described procedure, after a plurality of points of the workpiece 1 are measured with the laser length-measuring unit 20 and the near-field measuring unit 30, the distance information of the workpiece measured with the laser length-measuring unit 20 (the distance information defined between the reference face and the surface of the workpiece) is compared with the driving amount of the actuator 32 before the output from the photon detector 38 of the near-field measuring unit 30 becomes the preset constant value, and the driving amount of the actuator 32 of the near-field measuring unit 30 is converted into the distance information. Namely, the driving amount of the actuator 32 of the near-field measuring unit 30 is calibrated.

After the calibration, the surface texture of the workpiece 1 is measured with the near-field measuring unit 30. In other words, the operation of the relative movement unit 3 is controlled to move the workpiece 1 such that the near-field probe 33 of the near-field measuring unit 30 is relatively moved along the surface of the workpiece 1, and also the actuator 32 is driven such that the output of the photon detector 38 of the near-field measuring unit 30 becomes constant.

During this operation, when the relative movement position along the surface of the workpiece 1 due to the relative movement unit 3 is obtained and the moving amount of the near-field probe 33 due to the actuator 32 is obtained, the surface texture of the workpiece 1 can be obtained according to the two pieces of information.

According to the first embodiment, following advantages can be expected.

(1) The two beams with the different wavelengths are employed and the laser beam with the larger wavelength is utilized for the near-field measuring unit 30 while the laser beam with the smaller wavelength is utilized for the laser length-measuring unit 20. Then, the same position of the workpiece 1 is measured, and the distance information of the workpiece obtained by measurement with the laser length-measuring unit 20 is used for calibrating the driving amount of the actuator 32 of the near-field measuring unit 30. Accordingly, the negative effect due to the material-dependency of the workpiece 1 can be eliminated, thereby providing high-accurate calibration.

In other words, with the use of the near-field measuring unit 30 and the laser length-measuring unit 20, the same position of the workpiece 1 is measured at the same time, or at different timings, so that the driving amount of the actuator 32 of the near-field measuring unit 30 is calibrated based on the information obtained by the measurement. Accordingly, the negative effect due to the material-dependency of the workpiece 1 can be eliminated, thereby providing high-accurate calibration. In particular, if the measurement is performed after the above-described calibration in each time as the workpiece 1 is replaced, the negative effect due to the material-dependency of the workpiece 1 can substantially completely be eliminated.

(2) Since there are provided the relative movement unit 3 that moves the workpiece 1 such that the near-field probe 33 is relatively moved along the surface of the workpiece 1 while the near-field probe 33 is moved close to the workpiece 1 and the drive controller 40 that drives the actuator 32 so that the output from the photon detector 38 becomes constant, by performing the measurement in which the workpiece 1 is moved such that the near-field probe 33 is relatively moved along the surface of the workpiece 1, and the near-field probe 33 is moved close to the workpiece 1 such that the output from the photon detector 38 becomes constant, the surface texture of the workpiece 1 can highly accurately be measured two-dimensionally or three-dimensionally.

(3) Since the calibration unit 50 that refers to the distance information of the laser irradiated portion of the workpiece measured by the laser length-measuring unit 20 and converts the driving amount of the actuator 32 of the near-field measuring unit 30 into the distance information, the driving amount of the actuator 32 of the near-field measuring unit 30 can automatically be calibrated.

(4) Since the optical axis of the laser beam of the near-field measuring unit 30 irradiated toward the near-field probe 33 is coaxially arranged relative to the optical axis of the laser beam of the laser length-measuring unit 20, the instrument becomes compact.

Second Embodiment

Figure 2:
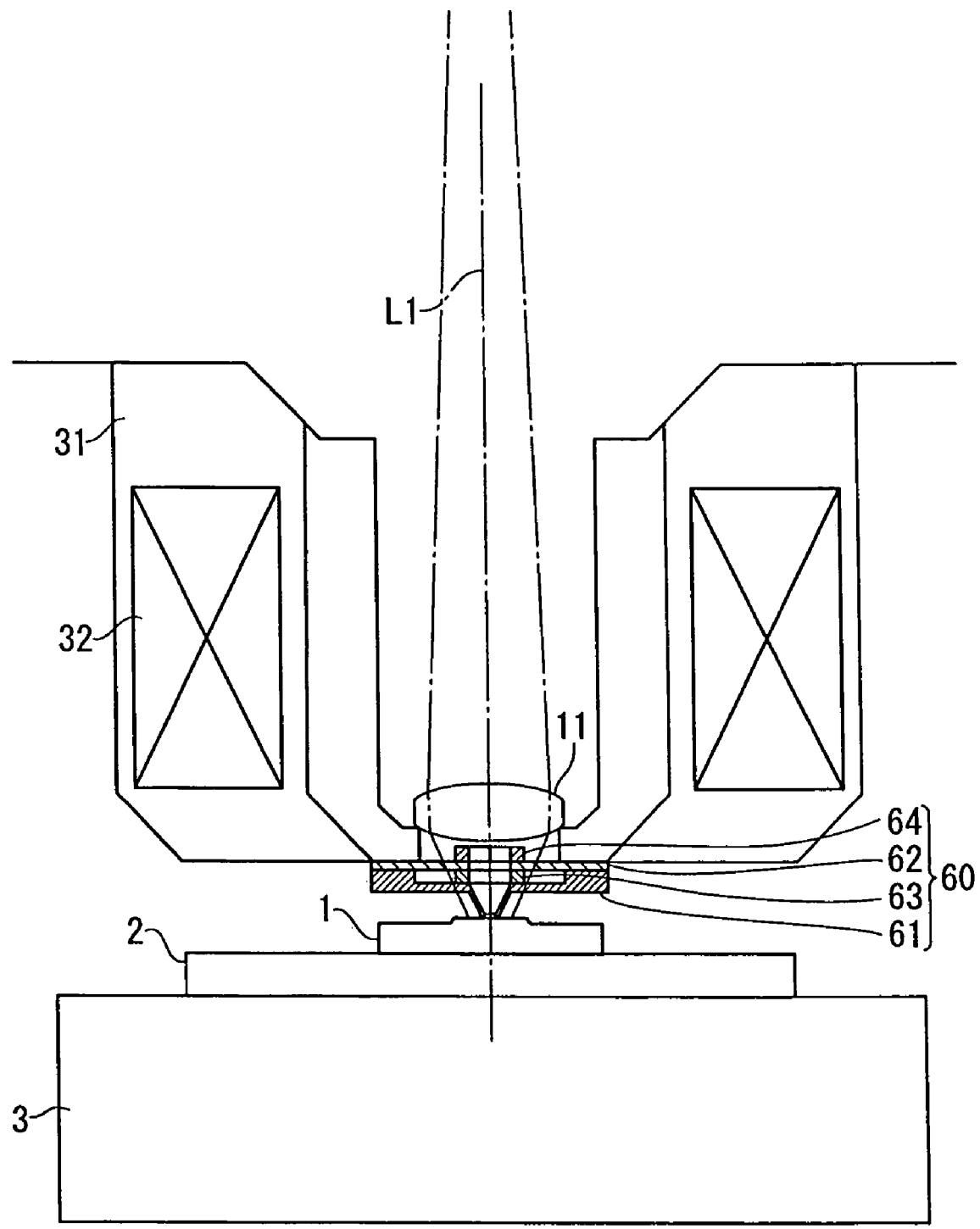
FIG. 2 is an enlarged view showing the primary portion of an optical microscope according to a second embodiment of the present invention.
Figure 3:
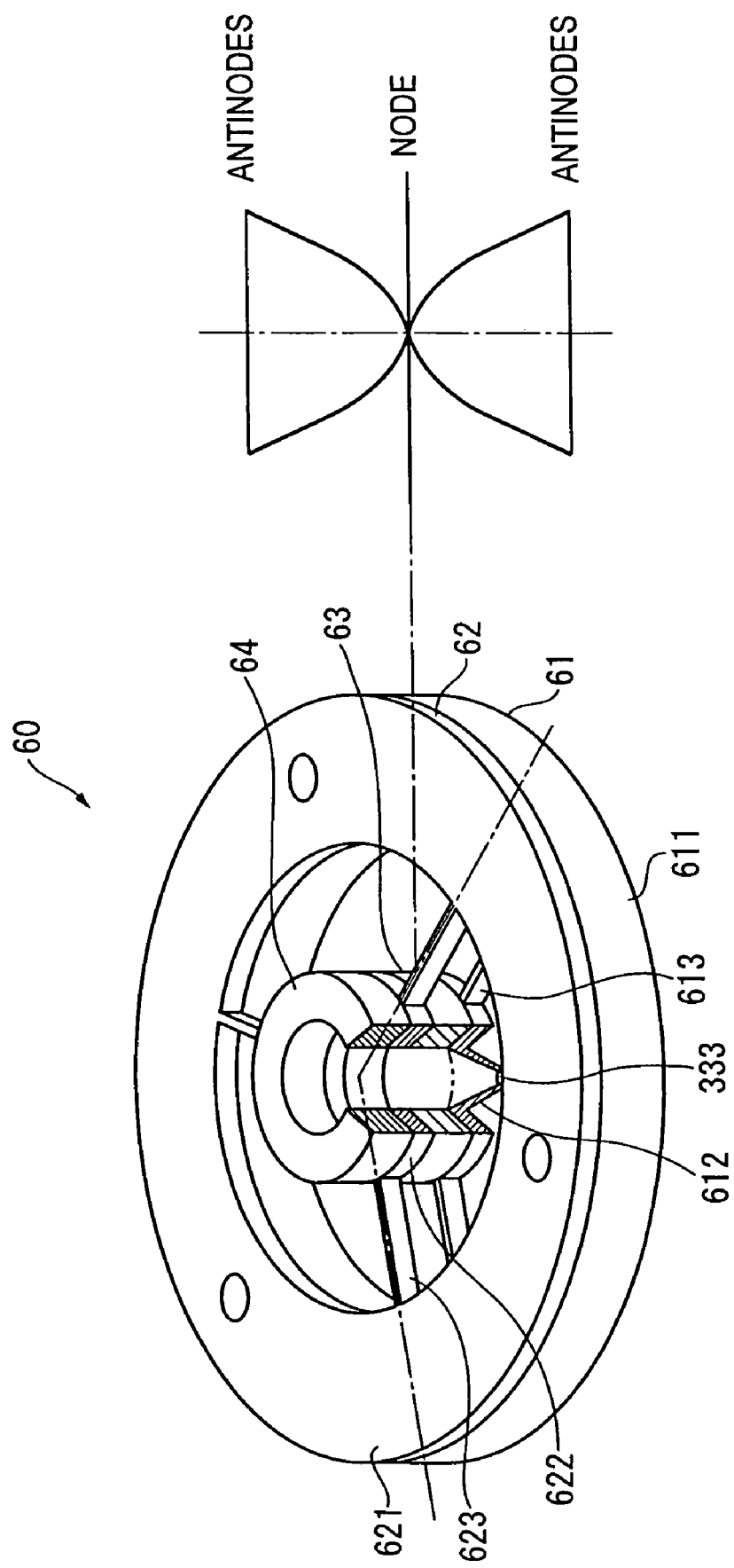
FIG. 3 is an illustration showing an example of a near-field probe applied to the optical microscope of the second embodiment.

FIG. 2 is a schematic illustration showing the primary portion of the optical microscope according to a second embodiment, and FIG. 3 is an enlarged perspective view showing a near-field probe applied to the second embodiment. Note that, when describing the drawings, the same components as the first embodiment will be assigned with the same reference numbers and the description thereof will be omitted.

The optical microscope of the second embodiment has a near-field probe different from that of the optical microscope in the first embodiment.

A near-field probe 60 of the second embodiment includes a first supporting body 61, a second supporting body 62 coupled to the first supporting body 61, a piezoelectric element 63 disposed between the first and second supporting bodies 61, 62, a balancer 64 disposed on a surface of the second supporting body 62 opposite to the piezoelectric element 63.

As shown in FIG. 3, the first supporting body 61 includes a ring-like first supporter 611 having a cylindrical space therein, a probe head 612 supported at the center of the first supporter 611, and a plurality (three) of beams 613 respectively extending from equiangular arrangement positions (120 degree interval positions) of the first supporter 611 toward the center to connect the probe head 612 with the first supporter 611. The probe head 612 is formed such that the inner diameter thereof is tapered toward the opposite side of the piezoelectric element 63. The opening 333 is provided at the tip end of the probe head 612. The diameter of the opening 333 is the same as that of the first embodiment.

As shown in FIG. 3, the second supporting body 62 includes a ring-like second supporter 621 having a cylindrical space therein, a holder 622 supported at the center of the second supporter 621, and a plurality (three) of beams 623 respectively extending from equiangular arrangement positions (120 degree interval positions) of the second supporter 621 toward the center to support the holder 622 at the center of the inner space of the second supporter 621.

Each of the beams 613, 623 are formed rectangular in cross section so that the dimension seen in observation direction with the CCD camera 13 is sufficiently small relative to the dimension along the optical axis LI direction (the dimension in vibration direction). In other words, when being observed by the CCD camera 13, the beams 613, 623 each have cross section to be thin as possible but able to be vibrated at high frequency.

Incidentally, the beams 613, 623 may not be arranged in the 120 degree interval positions, and may be arranged in 180 degree interval positions with each two beams, in 90 degree interval positions with each four beams, or in smaller degree interval positions with each larger number of beams. The point is to meet the requirements that the beams can be vibrated at higher frequency than that of the conventional cantilever structure.

As shown in FIG. 3, the piezoelectric element 63 is disposed between the probe head 612 of the first supporting body 61 and the holder 622 of the second supporting body 62, the piezoelectric element 63 being cylindrical centering on the axis penetrating through the center of the first and second supporting bodies 61, 62 and able to vibrate in the axial direction.

The balancer 64 is cylindrical and coaxially disposed relative to the axis of the piezoelectric element 63, of which mass is equal to that of the probe head 332.

According to the optical microscope using the near-field probe 60, calibration is performed in the same manner as the above-described embodiment.

First, the portion of the workpiece 1 to be measured is roughly defined with the optical observation unit 10. The light from the light source 14 is irradiated on the workpiece 1 through the half-mirrors 12, 34 and objective lens 11, as well as through clearances of the beams 613, 623 of the near-field probe 60. While the reflected light is observed by the CCD camera 13, the portion of the workpiece 1 to be measured is roughly defined. At this time, since the near-field probe 60 is disposed close to the objective lens 11 and the beams 613, 623 of the near-field probe 60 each are formed thin when seen in the observation direction with the CCD camera 13, in observation with the CCD camera 13, the workpiece 1 can clearly be observed without difficulty to see the near-field probe 60 due to the disturbance of the beams 613, 623.

After the portion of the workpiece 1 to be measured is roughly defined by the CCD camera 13, the measurement is performed by the near-field measuring unit 30. In the present embodiment, the measurement is performed with the piezoelectric element 63 of the near-field probe 60 being vibrated. As the piezoelectric element 63 is vibrated, the near-field probe 60 is vibrated in the axial direction. At this instant, the near-field probe 60 is vibrated at the frequency lower than the natural frequency fc. Owing to this, an output signal with the same period as the vibration period of the near-field probe 60 is output. By demodulating the output signal with a Band-Pass Filter (BPF) or a Peak Hold (PH), disturbance vibration can be restrained.

Since the probe head 612 is supported at the center of the inner space of the first and second supporters 611, 621 via the each three beams 613, 623 respectively extending from the equiangular arrangement positions of the first and second supporters 611, 621 of the first and second supporting bodies 61, 62, remarkably high frequency can be excited as compared to the ordinary cantilever probe. In many cases, when the position of the probe etc. is controlled in accordance with the feedback fed by a sensor, if the control is based on the frequency higher than the natural frequency fc, the probe will be oscillated. This is because the phase is rapidly lagged due to the resonance frequency of the sensor as in physical background. Since the present invention has the above-described configuration, the natural frequency fc can be heightened, thereby realizing of heightening vibration as well as speeding up of the measurement.

Since the near-field probe 60 has longitudinal vibration, the near-field probe 60 will not affect on the optical property as compared to having of flexural vibration, thus providing high accurate measurement. And, as shown in FIG. 3, the vibration mode is vertically symmetrical with the center being the node of vibration, so that the vibration can be restrained by the supporting bodies 61, 62 to function as a so-called dynamic vibration absorber.

The present invention is not limited to the above-described embodiments and includes modifications and rearrangements without departing from the spirit of the present invention.

The near-field probe is not limited to the above-described structure. For example, a cantilever probe may alternatively be employed, which forms a near-field light region at a tip end thereof by irradiating the light on the tip end. In this case, it is only required that the laser beam from the laser length-measuring unit 20 passes through the near-field light region formed at the tip end of the near-field probe.

The laser length-measuring unit 20 may be other structure or other formation without limiting to the laser length-measuring interferometer according to the above-described embodiments as long as the laser light is used for highly accurately measuring the distance.

In measurement with the laser length-measuring unit 20, the relative distance between the reference position (reference face 24) and the workpiece right below the tip end of the near-field probe 33, 60 is measured, however, the relative distance between the reference position (reference face 24) and the near-field probe 33, 60 (the end opposite to the opening) may alternatively be measured if the workpiece is moved close to/away from the near-field probe 33, 60.

As for the relative movement unit 3, as described in the embodiments, the table 2 may not be moved horizontally, longitudinally and vertically, and the near-field probe 33, 60 may be moved horizontally and longitudinally.

Also in the case of the actuator 32, as stated in the above-described embodiments, the near-field probe 33, 60 may not be moved vertically, and the table 2 may be moved vertically (in the direction close to/away from the near-field probe 33, 60).

The priority application No. JP2004-319388 upon which this patent application is based is hereby incorporated by reference.

What is claimed is:

1. A surface texture measuring instrument provided with a near-field measuring unit including a near-field probe that forms a near-field light at a tip end thereof when a laser beam is irradiated, a laser source that generates the laser beam to be irradiated on the near-field probe, a detection element that detects scattering effect of the near-field light generated when the near-field probe is moved close to a workpiece, and an actuator that displaces the near-field probe and the workpiece in a direction moving close to/away from each other, comprising: a laser length-measuring unit that measures a relative distance between a reference position and the workpiece in the vicinity of the tip end of the near-field probe, wherein the laser source generates the laser beam with wavelength λ1, the laser length-measuring unit utilizes the laser beam with wavelength λ2 which is smaller than the wavelength λ1, and the near-field probe has an opening through which the laser beams from the laser source and the laser length-measuring unit are input, the opening being larger than wavelength λ2 and smaller than wavelength λ1 in diameter.

2. The surface texture measuring instrument according to claim 1, wherein the laser length-measuring unit is a laser length-measuring interferometer that splits the laser beam into two beams, one of which is irradiated on the workpiece in the vicinity of the tip end of the near-field probe and the other one of which is irradiated on a reference face as the reference position, to measure a relative distance between the reference position and a laser irradiated portion of the workpiece based on interference light caused by reflected light from the workpiece and reflected light from the reference position.

3. The surface texture measuring instrument according to claim 1, further comprising:
a relative movement unit that moves the workpiece such that the near-field probe is relatively moved along the surface of the workpiece; and
a drive controller that drives the actuator such that an output from the detection element becomes constant.

4. The surface texture measuring instrument according to claim 1, wherein an optical axis of the laser beam of the near-field measuring unit irradiated toward the near-field probe is coaxially arranged relative to an optical axis of the laser beam of the laser length-measuring unit.

5. The surface texture measuring instrument according to claim 1, wherein
the near-field probe includes a first supporting body, a second supporting body coupled to the first supporting body, a piezoelectric element disposed between the first and second supporting bodies, and a balancer disposed on a surface of the second supporting body opposite to the piezoelectric element,
the first supporting body includes a first supporter having an inner space, and a probe head supported at the center of the inner space of the first supporter via a plurality of beams respectively extending from equiangular arrangement positions of the first supporter toward the center and having an opening for forming the near-field light,
the second supporting body includes a second supporter coupled to the first supporter and having an inner space, and a ring-like holder supported at the center of the inner space of the second supporter via a plurality of beams respectively extending from equiangular arrangement positions of the second supporter toward the center,
the piezoelectric element is disposed between the probe head of the first supporting body and the holder of the second supporting body and is formed cylindrical centering on an axis penetrating through the center of the first and second supporting bodies so as to vibrate in the axial direction, and
the balancer is cylindrical and coaxially disposed relative to the axis of the piezoelectric element, mass of the balancer being equal to that of the probe head.

6. The surface texture measuring instrument according to claim 1, further comprising: a calibration unit that refers to relative distance information measured by the laser length-measuring unit and converts a driving amount of the actuator of the near-field measuring unit into distance information.

* * * * *